UNITED STATES PATENT OFFICE.

HEINRICH KRIEGSHEIM, OF NEW YORK, N. Y.

WATER-PURIFYING MATERIAL AND PROCESS OF MAKING SAME.

1,312,552.   Specification of Letters Patent.   Patented Aug. 12, 1919.

No Drawing.   Application filed October 14, 1916.   Serial No. 125,569.

*To all whom it may concern:*

Be it known that I, HEINRICH KRIEGSHEIM, a citizen of Germany, residing at New York, in the county of New York and State of New York, have invented certain new and useful Improvements in Water-Purifying Materials and Processes of Making Same, of which the following is a specification.

This invention relates to water purifying materials and processes of making and using same; and it comprises as a new article of manufacture, a water purifying material in granulated form, each granule comprising a skeleton or body of baked clay or the like containing incorporated hydrated material having base-exchanging properties; and it also comprises a method of preparing such material wherein a natural or artificial mixture of clay or kaolinite with fine silicious hydrated base-exchanging material is heated at such a temperature that the clay or kaolinite component will frit or harden to give a rigid framework, the temperature, however, not being so high that the baked product will become so chemically altered as to lose its capacity for taking up water of hydration after the heating or its power of base exchange to a substantial extent; all as more fully hereinafter set forth and as claimed.

In the art of softening water and in various other industries, it is now the practice to use base-exchanging material containing in combination silica, alumina, alkalis and water. These are termed zeolites. Such a material upon treatment with a solution containing a given base has the property of taking up that base until it is saturated to a sufficient degree. It may be thereafter revived by treatment with a solution containing another base. For example, in softening water the water is passed through a bed of granulated material of the character described and in passage it exchanges the lime and magnesia, to which it owes its hardness, for sodium contained in the base-exchange material. After a sufficient degree of action is attained, the material may be revived by a treatment with a solution of common salt, whereupon the lime and magnesia taken up by the silicate are exchanged for sodium and go into solution. The revived silicate is now ready for reuse.

In the art, these materials are generally made by rather complicated and rather expensive processes. In one type of process, materials containing silica, alumina and alkali are fused together to form a melt which is thereafter treated with hot water in certain ways to produce a highly pervious hard granular material. In another type of process these mixtures are made by precipitation, the precipitate containing alumina, silica and alkali, being washed and dried in special ways to get the necessary hard and rigid granules. For, in this art, it it not only necessary that the material shall have the chemical property of exchanging bases in a high degree, but it must also be in granules which are mechanically strong, rigid and resistant in order to withstand the trying conditions of use. In use, these materials are employed in a filter-like bed through which the water is passed, and the granules must resist not only the action of the water but their own weight without mudding down, sliming or losing their shape.

There are a number of natural materials which also have exchange properties but these natural materials, where of high activity, generally do not have the mechanical strength required. For example, the glassy or amorphous portions of many rocks, stones, tuffs, trass, etc., of volcanic or eruptive origin, and even, in many cases, the amorphous portions in clay and soils which may be of sedimentary origin, have base-exchanging properties in a greater or less degree. These properties are conditioned upon the presence of what may be called water of hydration; the highly active materials contain water of constitution or water of hydration. When this is expelled by heating to such a temperature that the material is chemically altered (as evinced by the heated material being incapable of again absorbing the water lost in heating) they lose much or all of their base-exchanging activity. Where the native materials are not naturally hydrated, they may be artificially hydrated by exposure to steam under pressure.

Many of these materials, however, which are of high chemical reactivity are not of good mechanical properties; neither can they be granulated or otherwise treated so as to give the proper form. Many, for example, exist in such finely divided form, as, for example certain clayey materials, that it is impracticable to use them in technical apparatus in their natural form.

I have found that these materials may in many cases be heated to as high as between 300° and 550° C. without great detriment to their chemical activity; without substantial loss of the water of constitution on which their activity depends. In the heating, of course more or less of the water of constitution is lost; but if the heating be not carried too high, this water of constitution will be reabsorbed on treatment with moisture, steam, water, etc. Roughly, for the present purposes, it may be said that water of constitution is that water which is retained in a short drying to, at or above the normal boiling point of water; say, 105° C. By the expression "without substantial loss of the water of constitution" I do not mean to imply that some of the water of constitution is not expelled as ordinarily some will be; but I mean that the heating must be such that the heated material on treatment with steam or the like will then take up substantially all its original water of hydration. So long as the material is not chemically altered in the heating operation it will either not lose its water of hydration or will not be so changed that the loss cannot be made up by an after treatment with steam, water, etc. Where heating is improperly conducted, the water is, so to speak, permanently expelled; that is, the material after heating cannot be rehydrated and caused to assume its original, or substantially its original, amount of water of constitution. In this matter, as I have found, time and temperature are in some degree reciprocal; that is, a short heating at a high temperature may be less detrimental than a long heating at a low temperature. And the temperatures which these hydrated materials are able to withstand without loss of activity are temperatures at which clay, kaolinite, and the like, will bake into a hard rigid structure. In the present invention therefore I incorporate finely powdered active natural material, such as fine powdered trass with a small proportion of clay and bake by a short exposure to a high temperature of slightly over 500° C.; the time of exposure being not over one or two hours. The material may be baked and thereafter granulated; or it may first be granulated and then baked. I find that a preliminary granulation with subsequent baking gives me a better control of conditions.

For some reason, I find that, particularly where much decayed natural materials are used containing large amounts of adhering water, it is better as a preliminary operation to dry the material to constant weight under, at or slightly above the temperature of boiling water prior to baking. With some such materials, I have found that a preliminary drying in the air or at temperatures around 100° C., to constant weight followed by baking gives a much better product than where the drying is omitted and baking at a high temperature directly resorted to. Some materials which lose their exchange properties nearly completely when directly baked, will not lose it, if first dried at a low temperature and then baked even where such baking is at temperatures and for times which would be destructive of the exchange properties without a preliminary drying. All these natural materials contain more or less iron which may be an active material in the final product, having the same functions, at least in part, as the alumina of the ordinary exchange silicates. Other parts of the iron are not useful in this way. And I have noticed that where the iron in the material is in the higher or ferric stage of oxidation, the preliminary drying is more useful than in cases where the iron is contained in the lower stage of oxidation or as ferrous compounds.

Very many of the native materials having base-exchanging properties upon microscopic examination will be found to be composed of two components; one amorphous and hydrated and the other more crystalline. The former or amorphous component is the one having reactivity. With these materials it will generally be found by heating in the manner herein described, the more crystalline component can be caused to frit, agglutinate or sinter so as to give a porous, rigid, hard material at temperatures at which the amorphous constituent does not lose a substantial amount of its activity.

Instead of making an artificial mixture of clay or the like with native active materials I may mix such clay with various artificial active materials. For instance, I may precipitate a solution of sodium aluminate by a solution of sodium silicate; wash and somewhat dry the precipitate, incorporate with a good plastic clay, and then bake.

Or instead of making an artificial mixture of clay or the like with these active materials I may use natural mixtures. I have found that in the case of many of the very highly active materials coming from the decay or weathering of volcanic, igneous or eruptive rocks there is more than enough clay or like mineral present to serve as a binder or a skeleton for the present purposes. Where clay is present, commonly the whole material is, like the clay, in a state of fine subdivision; that is it powders readily or in treatment with water breaks up into a mud. With such a material, it is merely necessary to form it into granules and bake (with or without a preliminary drying as described), in such a way that the clay component is rendered hard and rigid while the active base-exchanging component is not robbed of any substantial amount of its water of hydration. In my material the porous granules may be considered as comprising a skeleton of hard and rigid baked clay containing incorporated therein small granules of active material. The baked clay granule is, of course, highly porous and the contained active materials are freely accessible to the solutions to be treated thereby. In other words, the active area presented by a granule may be very great; and the clay after baking gives all the necessary strength and rigidity to fit the material for water purification as described. After baking the material may be used in filter-like beds through which the water to be softened is run until such material shows a diminution in activity. It may then be revivified by treatment with a salt solution. To the salt solution it gives up the lime and magnesia abstracted from the hard water, taking on sodium in their lieu. It is now ready for reuse for purifying water.

In a specific embodiment of the present invention using a natural mixture, I may take much decayed obsidian, the decay having gone far enough that the material is plastic enough and form into pellets with the aid of water. If necessary, these pellets may be submitted to a drying operation. Baking may be at a temperature of 550° C. or somewhat less provided the time of exposure is not over an hour or so.

The best conditions with any material of this character can be learned by practice, but in most cases one or two hours baking at around 500° to 550° C. will give the results desired. Exact control can be given by observation of the base-exchanging capacity of the final product. Conditions should be so controlled as, on the one hand, to obtain a maximum activity of base-exchange, and on the other hand, a maximum strength, rigidity and hardness.

In another embodiment of my invention in making an artificial mixture, I may take the decayed obsidian, grind it if necessary, mix with a little clay and proceed as before.

In still another embodiment of my invention in making an artificial mixture, I may precipitate a solution of commercial sodium silicate (waterglass) with a solution of sodium aluminate in the equivalent amount. The precipitate may be filter-pressed and washed to some extent. Without drying, it is mixed with the proper amount of a plastic clay, say enough to make 10 per cent. of the finished material, dried somewhat, formed into pellets of the required dimensions and baked as before; the baking temperature and time being such as to produce hardening of the clay without materially detracting from the reactivity of the precipitate.

The word "clay" in the foregoing description is of course used in its ordinary significance of a native very fine material which on baking in the way used in the pottery industry and the like will harden and become rigid. It is ordinarily, but not necessarily, composed mainly of hydrated aluminum silicates. The function of the clay in the present invention is mainly, so to speak, a mechanical function; that of giving strength and rigidity to the product. The clay is a holding member for the active base-exchanging member of a combination.

What I claim is:—

1. In the manufacture of granulated base-exchanging materials the process which comprises baking a mixture containing a clay component and a reactive hydrated silicate component at such a temperature that the clay component frits or sinters while the reactive hydrated silicate component is substantially unaffected.

2. In the manufacture of granulated base-exchanging materials the process which comprises baking a natural mixture of a hydrated, amorphous, highly reactive material of base-exchanging properties with a clayey component at such a temperature that the clayey component frits or sinters while the hydrated component is substantially unaffected.

3. In the manufacture of granulated base-exchanging materials the process which comprises preliminarily drying a mixture containing a clay component and an active hydrated silicate, the drying being to substantially constant weight at a low temperature and baking the dried mixture at such a temperature that the clay component frits or sinters while the reactive hydrated silicate component is substantially unaffected.

4. In the manufacture of granulated base-exchanging materials the process which comprises drying a natural mixture of a hydrated amorphous highly active material of base-exchanging properties and a clay component, the drying being to substantially constant weight at a low temperature, and then baking the dried material at such a temperature that the clay component frits or sinters while the hydrated component is substantially unaffected.

5. As a new material, a granulated material having base-exchanging properties and existing as hard rigid granules, such granules containing strength-giving fritted clay material and a hydrated silicate material of base-exchanging properties.

6. In the purification of water, the process which comprises baking a clayey material having exchange properties until such material assumes a hardened, mechanically strong and resistant form without substantial loss of its chemical properties, passing water to be softened through a granular bed of the treated material and thereafter revivifying such material with the aid of a salt solution, passage of water to be softened through such bed and of revivifying salt solution being alternate.

7. In the manufacture of granulated base-exchanging materials the process which comprises adding to a hydrated, amorphous, highly reactive material of base-exchanging properties a clay material and baking the mixture at such a temperature that the clay component frits or sinters while the hydrated component is substantially unaffected.

8. An assemblage of zeolite particles bound into a hard and rigid but porous body by a water-resistant binding material.

9. An assemblage of zeolite particles bound into a hard and rigid but porous body by a sintered water-resistant binding material.

In testimony whereof I affix my signature.

HEINRICH KRIEGSHEIM.